(12) United States Patent
Rahman et al.

(10) Patent No.: US 8,156,456 B1
(45) Date of Patent: Apr. 10, 2012

(54) UNIFIED DESIGN METHODOLOGY FOR MULTI-DIE INTEGRATED CIRCUITS

(75) Inventors: Arifur Rahman, San Jose, CA (US); Min-Hsing Chen, Campbell, CA (US)

(73) Assignee: Xilinx, Inc., San Jose, CA (US)

( * ) Notice: Subject to any disclaimer, the term of this patent is extended or adjusted under 35 U.S.C. 154(b) by 126 days.

(21) Appl. No.: 12/829,213

(22) Filed: Jul. 1, 2010

(51) Int. Cl.
G06F 17/50 (2006.01)

(52) U.S. Cl. ........ 716/104; 716/119; 716/129; 716/130; 716/132; 716/138; 703/16

(58) Field of Classification Search .................. 716/104, 716/119, 129, 130, 132, 138; 703/16
See application file for complete search history.

(56) References Cited

U.S. PATENT DOCUMENTS

| | | | |
|---|---|---|---|
| 5,510,999 A * | 4/1996 | Lee et al. ....................... | 716/113 |
| 6,915,252 B1 * | 7/2005 | Li ................................... | 703/22 |
| 7,636,798 B2 * | 12/2009 | Faulhaber et al. ............... | 710/13 |
| 2002/0032493 A1 * | 3/2002 | Kadowaki et al. ............... | 700/97 |
| 2003/0237069 A1 * | 12/2003 | Mohan et al. ...................... | 716/8 |
| 2005/0028126 A1 * | 2/2005 | Kan et al. ........................... | 716/17 |
| 2005/0071792 A1 * | 3/2005 | Ferguson et al. .................. | 716/4 |
| 2006/0214794 A1 * | 9/2006 | Wang .......................... | 340/572.1 |
| 2008/0109780 A1 * | 5/2008 | Stern et al. ....................... | 716/11 |
| 2008/0163144 A1 * | 7/2008 | Nakahata ........................... | 716/5 |
| 2008/0256500 A1 * | 10/2008 | Cobb et al. ......................... | 716/5 |
| 2010/0031212 A1 * | 2/2010 | Dong et al. ....................... | 716/8 |
| 2010/0306719 A1 * | 12/2010 | Smayling .......................... | 716/4 |

* cited by examiner

*Primary Examiner* — Phallaka Kik
(74) *Attorney, Agent, or Firm* — Kevin T. Cuenot

(57) ABSTRACT

A method of designing an integrated circuit (IC) having multiple dies can include identifying a unified design library having a first process node specific (PNS) library for a first IC process technology and a second PNS library for a second IC process technology. The first PNS library can be correlated with a first die of the IC. The second PNS library can be correlated with the second die of the IC. Via a processor, a circuit element can be defined within a circuit design implemented within the IC according to the PNS library correlated to the die in which the circuit element is located.

20 Claims, 4 Drawing Sheets

UNIFIED DESIGN METHODOLOGY FOR MULTI-DIE INTEGRATED CIRCUITS

FIELD OF THE INVENTION

One or more embodiments disclosed within this specification relate to integrated circuits (ICs). More particularly, one or more embodiments relate to unified design for an IC that includes multiple dies.

BACKGROUND

Electronic design automation (EDA) tools refer to a class of computer-programs that perform any of a variety of different circuit design-related functions. Some EDA tools, for example, allow a circuit designer to specify a circuit design at a high level of abstraction. The EDA tool can translate a programmatic description of a circuit design specified in a hardware description language into actual circuitry for implementation within an integrated circuit (IC). Other EDA tools can present a visual representation of the physical layout of a circuit design as implemented "on-chip" and allow the circuit designer to manipulate and/or analyze the layout. Still other EDA tools can perform functions such as placement, routing, timing analysis, power consumption analysis, and/or different combinations of the functions described.

In order to perform the circuit design related functions, the EDA tool operates with reference to a particular technology library. The technology library contains data that is specific to a particular IC process technology. For example, the technology library can include standard cells usable within the IC process technology, design rule checks relating to spacing requirements for the IC process technology, and the like. In order to obtain meaningful results when conducting timing analysis, design rule checking, or performing any of a variety of other functions, the EDA tool must be configured to utilize the technology library corresponding to the particular IC process technology that will be used to implement and manufacture the circuit design being created.

SUMMARY

One or more embodiments disclosed within this specification relate to integrated circuits (ICs) and, more particularly, to unified circuit design techniques for an IC that includes multiple dies. One or more embodiments can include a method of designing circuits for implementation within an IC having multiple dies. The method can include identifying a unified design library including a first process node specific (PNS) library for a first IC process technology and a second PNS library for a second IC process technology. The first PNS library can be correlated with a first die of the IC. The second PNS library can be correlated with a second die of the IC. A circuit element of a circuit design can be defined, via a processor, for implementation within the IC according to the PNS library correlated with the die in which the circuit element is located.

The method can include concurrently displaying, via a display device, a first portion of the circuit design for implementation within the first die and a second portion of the circuit design for implementation within the second die while indicating the die within which each portion of the circuit design is to be implemented. In one aspect, displaying can include presenting a circuit schematic view of the first portion of the circuit design and a circuit schematic view of the second portion of the circuit design concurrently. In another aspect, displaying can include presenting a layout view of the first portion of the circuit design and a layout view of the second portion of the circuit design concurrently.

The method can include defining each circuit element of the circuit design implemented within the first die of the IC according to the first PNS library and defining each circuit element of the circuit design implemented within the second die of the IC according to the second PNS library.

The method also can include performing design rule checking on a first portion of the circuit design implemented within the first die using the first PNS library and performing design rule checking on a second portion of the circuit design implemented within the second die using the second PNS library.

In another aspect, the circuit design can specify a layout of the circuit design for the first die and a layout of the circuit design for the second die. Accordingly, the method can include determining first components from the layout of the circuit design for the first die according to the first PNS library, determining second components from the layout of the circuit design for the second die according to the second PNS library, and generating a netlist for the circuit design comprising the first components and the second components.

The method further can include determining first parasitic circuit elements for a first portion of the circuit design within the first die according to the first PNS library, determining second parasitic circuit elements for a second portion of the circuit design within the second die according to the second PNS library, and including the first parasitic circuit elements and the second parasitic circuit elements within the netlist.

In still another aspect, the method can include extracting a circuit property for a selected signal path defined by a start point within the first die of the IC and an end point within the second die of the IC.

One or more other embodiments can include a system for designing circuits for implementation within an IC having multiple dies. The system can include a memory storing program code and a processor coupled to the memory. The processor, upon executing the program code, can be configured to perform a plurality of steps. The steps can include identifying a unified design library having a first PNS library for a first IC process technology and a second PNS library for a second IC process technology, correlating the first PNS library with a first die of the IC, and correlating the second PNS library with a second die of the IC. The processor further can be configured to define an element of a circuit design implemented within the IC according to the PNS library correlated with the die in which the circuit element is located.

The system can include a display device coupled to the processor. The display device can be configured to concurrently display a first portion of the circuit design for implementation within the first die and a second portion of the circuit design for implementation within the second die while indicating the die within which each portion of the circuit design is to be implemented.

The processor can be configured to perform steps including defining each circuit element of the circuit design implemented within the first die of the IC according to the first PNS library and defining each circuit element of the circuit design implemented within the second die of the IC according to the second PNS library.

The processor further can be configured to perform steps including performing design rule checking on a first portion of the circuit design implemented within the first die using the first PNS library and performing design rule checking on a second portion of the circuit design implemented within the second die using the second PNS library.

In another aspect, the circuit design can specify a layout of the circuit design for the first die and a layout of the circuit design for the second die. Accordingly, the processor can be configured to perform steps including determining first components from the layout of the circuit design for the first die according to the first PNS library, determining second components from the layout of the circuit design for the second die according to the second PNS library, and generating a netlist for the circuit design including the first components and the second components.

The processor also can be configured to perform steps including determining first parasitic circuit elements for a first portion of the circuit design within the first die according to the first PNS library, determining second parasitic circuit elements for a second portion of the circuit design within the second die according to the second PNS library, and including the first parasitic circuit elements and the second parasitic circuit elements within the netlist.

In addition, the processor can be configured to perform a step including extracting a circuit property for a selected signal path defined by a start point within the first die of the IC and an end point within the second die of the IC according to the unified design library.

One or more other embodiments can include a device. The device can include a non-transitory data storage medium usable by a processor. The data storage medium can store program code that, when executed by the processor, causes the processor to execute operations. The operations can include identifying a unified design library including a first PNS library for a first IC process technology and a second PNS library for a second IC process technology, correlating the first PNS library with a first die of the IC, and correlating the second PNS library with a second die of the IC. The operations can include defining a circuit element of a circuit design implemented within the IC according to the PNS library correlated with the die in which the circuit element is located.

The data storage medium can store program code that, when executed, causes the processor to execute an operation including concurrently displaying a first portion of the circuit design for implementation within the first die and a second portion of the circuit design for implementation within the second die while indicating the die within which each portion of the circuit design is to be implemented.

The data storage medium also can store program code that, when executed, causes the processor to execute operations including defining each circuit element of the circuit design implemented within the first die of the IC according to the first PNS library and defining each circuit element of the circuit design implemented within the second die of the IC according to the second PNS library.

The data storage medium further can store program code that, when executed, causes the processor to execute operations including determining first components from a layout of the circuit design for the first die according to the first PNS library and determining second components from the layout of the circuit design for the second die according to the second PNS library. The data storage medium also can store program code that, when executed, causes the processor to perform a step of generating a netlist for the circuit design including the first components and the second components.

DETAILED DESCRIPTION

While the specification concludes with claims defining features of one or more embodiments that are regarded as novel, it is believed that the one or more embodiments will be better understood from a consideration of the description in conjunction with the drawings. As required, one or more detailed embodiments are disclosed within this specification. It should be appreciated, however, that the one or more embodiments are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the one or more embodiments in virtually any appropriately detailed structure. Further, the terms and phrases used herein are not intended to be limiting, but rather to provide an understandable description of the one or more embodiments disclosed herein.

One or more embodiments disclosed within this specification relate to integrated circuits (ICs) and, more particularly, to circuit design for an IC that includes multiple dies. An IC that is formed of two or more dies can be referred to as a "multi-die IC." In accordance with the one or more embodiments disclosed within this specification, a unified design environment is disclosed that provides circuit design related functions for specifying and/or analyzing circuits for implementation within a multi-die IC. In one or more embodiments, a multi-die IC can include a plurality of dies, with two or more or all dies being implemented using a different IC process technology. Within the unified design environment provided, a circuit designer can create, edit, and/or analyze various aspects of a circuit design that is to be implemented within the multi-die IC despite the use of different IC process technologies in constructing the multi-die IC.

Conventional circuit design tools have been directed to circuit design using ICs constructed using a single die. Being formed of a single die, the IC is manufactured or fabricated using a single IC process technology. In this regard, conventional circuit design tools have been limited to contending with one IC process technology at any given time and for any given project, e.g., circuit design.

Figure 1:
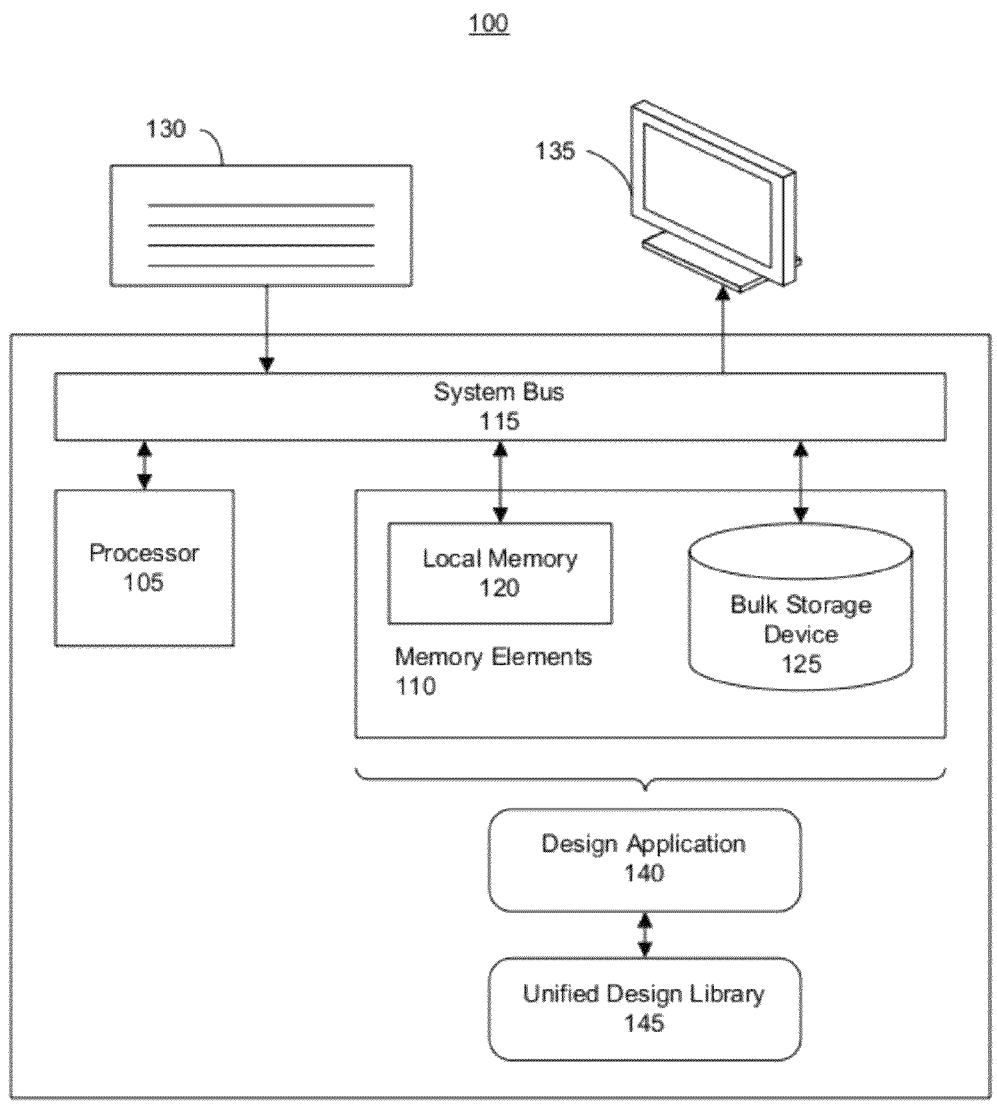
FIG. 1 is a first block diagram illustrating a system for circuit design in accordance with one or more embodiments disclosed within this specification.

FIG. 1 is a first block diagram illustrating a system 100 for circuit design in accordance with one or more embodiments disclosed within this specification. System 100 can generate one or more circuit designs for instantiation within, or implementation as, a multi-die IC. The circuit designs that are generated can be instantiated within a multi-die IC, whether the multi-die IC is a programmable IC or not.

Programmable ICs are a well-known type of IC that can be programmed to perform specified logic functions. One type of programmable IC, the field programmable gate array (FPGA), typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect circuitry and programmable logic circuitry. The programmable interconnect circuitry typically includes a large number of interconnect lines, e.g., wires, of varying lengths interconnected by programmable interconnect points (PIPs). The programmable logic circuitry implements the logic of a user design using programmable elements that can include, for example, function generators, registers, arithmetic logic, and so forth.

The programmable interconnect circuitry and programmable logic circuitry are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of programmable IC is the complex programmable logic device, or CPLD. A CPLD includes two or more "function blocks" connected together and to input/output (I/O) resources by an interconnect switch matrix. Each function block of the CPLD includes a two-level AND/OR structure similar to those used in programmable logic arrays (PLAs) and programmable array logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices. Programmable ICs can also be implemented in other ways, e.g., using fuse or antifuse technology. The phrase "programmable IC" can include, but is not limited to these devices and further can encompass devices that are only partially programmable. For example, one type of programmable IC includes a combination of hard-coded transistor logic and a programmable switch fabric that programmably interconnects the hard-coded transistor logic. In the case of a multi-die IC, at least one of the dies can be programmable as described within this specification for the entirety of the multi-die IC to be considered a programmable IC.

System 100 can include at least one processor 105 coupled to memory elements 110 through a system bus 115. As such, system 100 can store program code within memory elements 110. Processor 105 can execute the program code accessed from memory elements 110 via system bus 115. In one aspect, for example, system 100 can be implemented as a computer that is suitable for storing and/or executing program code. It should be appreciated, however, that system 100 can be implemented in the form of any system including a processor and memory that is capable of performing the functions described within this specification.

Memory elements 110 can include one or more physical memory devices such as, for example, local memory 120 and one or more bulk storage devices 125. Local memory 120 can refer to random access memory or other memory device(s) generally used during actual execution of the program code. Bulk storage device(s) 125 can be implemented as a hard drive or other persistent data storage device. System 100 also can include one or more cache memories (not shown) that provide temporary storage of at least some program code in order to reduce the number of times program code must be retrieved from bulk storage device 125 during execution.

Input/output (I/O) devices such as a keyboard 130, a display 135, and a pointing device (not shown) optionally can be coupled to system 100. The I/O devices can be coupled to system 100 either directly or through intervening I/O controllers. Network adapters also can be coupled to system 100 to enable system 100 to become coupled to other systems, computer systems, remote printers, and/or remote storage devices through intervening private or public networks. Modems, cable modems, and Ethernet cards are examples of different types of network adapters that can be used with system 100.

Memory elements 110 can store a design application 140 and a unified design library 145. Design application 140 and unified design library 145, being implemented in the form of program code, can be executed by system 100. In general, design application 140 can implement circuit design functions for creating, editing, and/or analyzing a circuit design to be implemented within a multi-die IC. Design application 140 provides a unified circuit design environment that facilitates, for example, physical design including layout, design rule checking, layout versus schematic (LVS) checking, and extraction for a multi-die IC where two or more dies used to construct the multi-die IC are fabricated using different IC process technologies.

Operation of design application 140 is facilitated through reliance upon unified design library 145. In cases where the multi-die IC is implemented using different IC process technologies, also referred to as process node technologies, unified design library 145 can include data specific to each process node technology used within the multi-die IC. Unified design library 145 can include data for two or more different IC process technologies. For example, data for each IC process technology can include process and connectivity information of devices and interconnects or process and connectivity information for interconnects only.

The phrase "process node" generally refers an IC process technology used to manufacture or fabricate an IC or a die of an IC. Accordingly, "process node specific" or "PNS" can refer to a particular, or specific, IC process technology. The phrase "process node" is generally used to refer to the size of a given circuit feature that can be created using the referenced PNS technology. For example, 40 nm, in reference to 40 nanometers, indicates an IC process technology capable of producing a circuit feature, i.e., a channel of a transistor, that is approximately 40 nm in size.

System 100, executing design application 140 and unified design library 145, can facilitate design of a circuit to be implemented within a multi-die IC. Accordingly, the resulting circuit design can be output in the form of a unified technology file that specifies the circuit elements of the circuit design, e.g., a netlist or the like, that are to be implemented across a plurality of different dies using a plurality of different IC process technologies. The term "outputting" and/or "output" can mean, for example, writing to a file, writing to a user display or other output device, storing in memory, sending or transmitting to another system, exporting, or the like.

Figure 2:
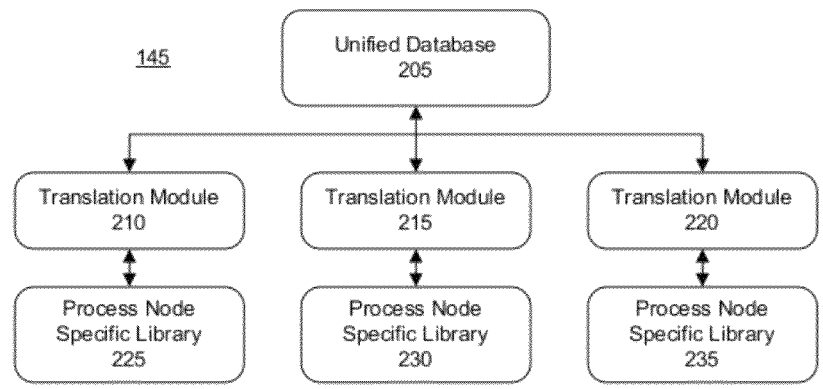
FIG. 2 is a second block diagram illustrating a unified design library in accordance with one or more other embodiments disclosed within this specification.

FIG. 2 is a second block diagram illustrating a unified design library in accordance with one or more other embodiments disclosed within this specification. More particularly, FIG. 2 illustrates an example of unified design library 145 as described with reference to FIG. 1. In general, unified design library 145 can include a unified database 205, a plurality of translation modules 210, 215, and 220, and a plurality of PNS libraries 225, 230, and 235.

Unified database 205 can function as an interface to a design application (not shown) as described with reference to FIG. 1. Unified database 205 can, for example, receive queries from the design application and provide the requested information to the design application in response. In one or more embodiments, unified database 205 can include one or more design blocks, one or more portions of intellectual property (IP), e.g., core(s), transistors, defined metal layers, design rule checks, and LVS checks. For example, unified database 205 can specify the various circuit elements and checking to be performed across each die included in the multi-die IC within which the circuit design is to be implemented.

In some cases, circuit elements specified within unified database 205 can be specified in whole, e.g., in their entirety. In other cases, however, circuit elements can be specified in part and include a reference or pointer to the more specific implementation information within one of the underlying PNS libraries 225-235. In illustration, unified database 205 can include a listing of design rule checks that can be performed upon a circuit design. One or more or all of the individual design rule checks specified can include a pointer to the specific design rule check that is to be performed for each die of the multi-die IC.

Each of translation modules 210-220 can specify a mapping of names for circuit elements specified within unified database 205 to names of corresponding circuit elements, e.g., transistors, metal layers, interconnects, etc., within one of the underlying PNS libraries 225-235. For example, translation module 210 can specify a mapping between circuit element names of unified database 205 and the corresponding circuit element names within PNS library 225. Translation module 215 can specify a mapping between circuit element names of unified database 205 and the corresponding circuit element names within PNS library 230. Similarly, translation module 215 can specify a mapping between element names of unified database 205 and the corresponding element names within PNS library 235.

Maintaining a mapping of the different names used to represent the layers of each die prevents layer naming collisions between two layers of different PNS libraries that use the same name. Because each of PNS libraries 225-235 is used within a same circuit design due to the multi-die nature of the target device, translation modules 210-220 allow simultaneous use of the layers from different underlying PNS libraries 225-235 via the design application and unified database 205. Accordingly, the end user interacts with the system in a unified way despite the fact that the circuit design is utilizing more than one PNS library at a time, e.g., concurrently. Translation modules 210-220, for example, can maintain a mapping of global layer names used within unified database 205 to the process specific name of the layer used within each of PNS libraries 225-235 respectively.

Each of PNS libraries 225-235 can include detailed information necessary to specify elements such as transistors, design rule checks, LVS rules, and the like for a particular IC process technology. For purposes of illustration, PNS library 225 can specify information for a 40 nm IC process technology. PNS library 230 can specify information for a 90 nm IC process technology. PNS library 235 can specify information for a mixed signal IC process library, a memory process library, or the like.

In operation, when a query from the design application is received, unified database 205 can determine the information requested in the query. Unified database 205 can submit information determined in answer to the received query back to the design application in the form of a response. Unified database 205 can identify the items of information requested in the query. Unified database 205 can determine the particular die, or PNS library, from which each requested item of information is to be retrieved.

For example, unified database 205 can maintain a mapping of dies to corresponding PNS libraries detailing the IC process technology used to manufacture each respective die of the multi-die IC. Thus, by determining the die within which a circuit element is located or the die to which a requested item of information relates, the corresponding PNS library can be identified. Unified database 205 can direct one or more queries to one or more or all of the individual PNS libraries 225-235, e.g., to the identified PNS library (or libraries), to obtain the information needed to respond to the query received from the design application.

Translation modules 210-220 can translate global names of data items utilized by unified database 205 to local or PNS names used within each respective PNS library 225-235 and vice versa. Results from each of PNS libraries 225-235 can be translated back into the global naming convention used within unified database 205 by translation modules 210-220. Unified database 205 can consolidate and compile the responses received from each individual PNS library 225-235 that was queried. Unified database 205 can sent the compiled information back to the design application.

Figure 3:
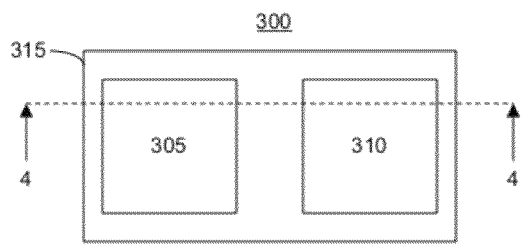
FIG. 3 is a third block diagram illustrating an overhead view of a multi-die integrated circuit (IC) in accordance with one or more other embodiments disclosed within this specification.

FIG. 3 is a third block diagram illustrating an overhead view of a multi-die IC 300 in accordance with one or more other embodiments disclosed within this specification. FIG. 3 illustrates one example of a multi-die IC for which the system for circuit design described herein can be used. As shown, multi-die IC 300 can include die 305 and die 310 disposed on a surface, e.g., a top surface or a bottom surface, of an interposer 315. Die 105 and die 110 can be in direct physical contact with interposer 315 or can be coupled through one or more intervening IC process layers that can include one or more circuit structures.

Each of dies 305 and 310 can implement any of a variety of different types of circuits or chips. For example, each of dies 305 and 310 can be implemented as a memory, a processor, or a programmable IC. In another example, die 305 can implement a memory and die 310 can implement a processor or a programmable IC. In still another example, one or both of dies 305 and 310 can implement application specific ICs or mixed signal ICs. The examples presented are for purposes of illustration and are not intended to limit the one or more embodiments disclosed within this specification.

Interposer 315 can communicatively link die 305 and die 310 by coupling selected pads of die 305 with selected pads of die 310. A connection between die 305 and die 310, in this case facilitated by interposer 315, can be referred to as an inter-die connection. An inter-die connection refers to a signal path that begins in a first die and traverses a boundary between the first die and the second die, e.g., a die-to-die connection through an inter-die wire (not shown).

For purposes of illustration, only two dies are shown in FIG. 3. The one or more embodiments described within this specification, however, are not intended to be limited by the number of dies disposed upon interposer 315. For example, three or more dies can be disposed on top of interposer 315. One or more embodiments of the system described within this specification can be used with other multi-die configurations as will be described within this specification in greater detail.

Figure 4:
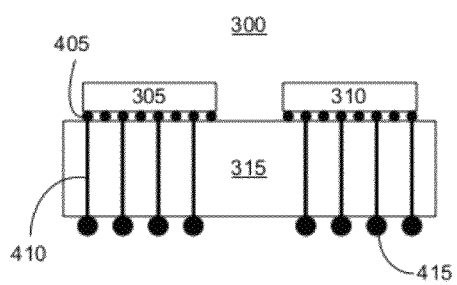
FIG. 4 is a first cross-sectional side view of a multi-die IC in accordance with one or more other embodiments disclosed within this specification.

FIG. 4 is a first cross-sectional side view of a multi-die IC in accordance with one or more other embodiments disclosed within this specification. FIG. 4 illustrates multi-die IC 300 of FIG. 3 in cross-section taken along cut-line 4 of FIG. 3. Accordingly, like numbers will be used to refer to the same items throughout this specification to the extent possible.

Interposer 315 can be implemented as a die formed of one or more layers of an IC process technique. Interposer 315 can include at least one metallization layer, but can include a plurality of metallization layers separated by appropriate insulating or non-conductive layers. The metallization layer, or layers as the case may be, implements a plurality of inter-die wires (not shown) that couple selected pads of die 305 to selected pads of die 310.

In one or more embodiments, interposer 315 can be configured as an entirely passive structure within which inter-die wires are implemented. In one or more other embodiments, interposer 315 can include one or more active devices and, thus, be considered an active structure. The one or more embodiments described within this specification are not intended to be limited to either passive or active interposers.

Die 305 and die 310 can be coupled to interposer 315 through a plurality of micro-bumps 405. Micro-bumps 405 generally are solder balls that electrically couple pads (not shown) of each of dies 305 and 310 to pads (not shown) of interposer 315. For example, during manufacture of multi-die IC 300, the bottom of die 305 and the bottom of die 310 can be micro-bumped. Similarly, the top of interposer 315 can be micro-bumped. Die 305 and die 310 can be aligned on the top of interposer 315 so that each micro-bump of dies 305 and 310 is aligned with a micro-bump on interposer 315. Aligned micro-bump pairs between interposer 315 and dies 305 and 310, can, through an IC manufacturing process, be merged to form a single electrical connection illustrated as micro-bumps 405.

Some pads of interposer 315 coupled to micro-bumps 405 can couple to through silicon vias (TSVs) 410. Each TSV 410 can extend completely through interposer 315 extending from a pad disposed immediately below the top surface of interposer 315 through to a pad exposed through the bottom surface of interposer 315. Each TSV 410 can couple a pad of one of dies 305 or 310, via a micro-bump 405, for example, to one of the plurality of package bumps 415.

Package bumps 415, also referred to as "C4 bumps," generally are solder balls that couple pads on the bottom portion of interposer 315 to the package of multi-die IC 300, and thus, to external pins of the package. Accordingly, one or more pads of die 305 and one or more pads of die 310 can be coupled to external pins of the package of multi-die IC 300 by coupling such pads to micro-bumps 405, to TSVs 410, to package bumps 415, and to external package pins.

Die 305, die 310, and interposer 315 can be manufactured separately, e.g., each as part of its own distinct wafer. In this regard, die 305 and die 310 can be made using a same or a different IC process technology. Similarly, interposer 315 can be made using an IC process technology that is different from one or both of die 305 and die 310.

Figure 5:
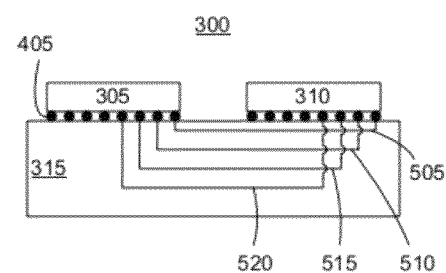
FIG. 5 is a second cross-sectional side view of a multi-die IC in accordance with one or more other embodiments disclosed within this specification.

FIG. 5 is a second cross-sectional side view of a multi-die IC in accordance with one or more other embodiments disclosed within this specification. FIG. 5 illustrates another exemplary implementation of multi-die IC 300 of FIG. 3 in cross-section taken along cut-line 4 of FIG. 3. For purposes of illustration, TSVs 410 and package bumps 415 are not shown to more clearly illustrate inter-die wires 505-520 disposed within interposer 315.

Referring to FIG. 5, interposer 315 includes a plurality of inter-die wires 505-520. Some pads of interposer 315 coupled to micro-bumps 405 can couple to one of inter-die wires 505-520. Each of inter-die wires 505-520 is effectively a long interconnect line within interposer 315 that couples die 305 to die 310. For example, each of inter-die wires 505-520 can couple a pad of die 305 to a pad of die 310. As shown, inter-die wires 505-520 can be disposed beneath the top surface, e.g., within, interposer 315.

Figure 6:
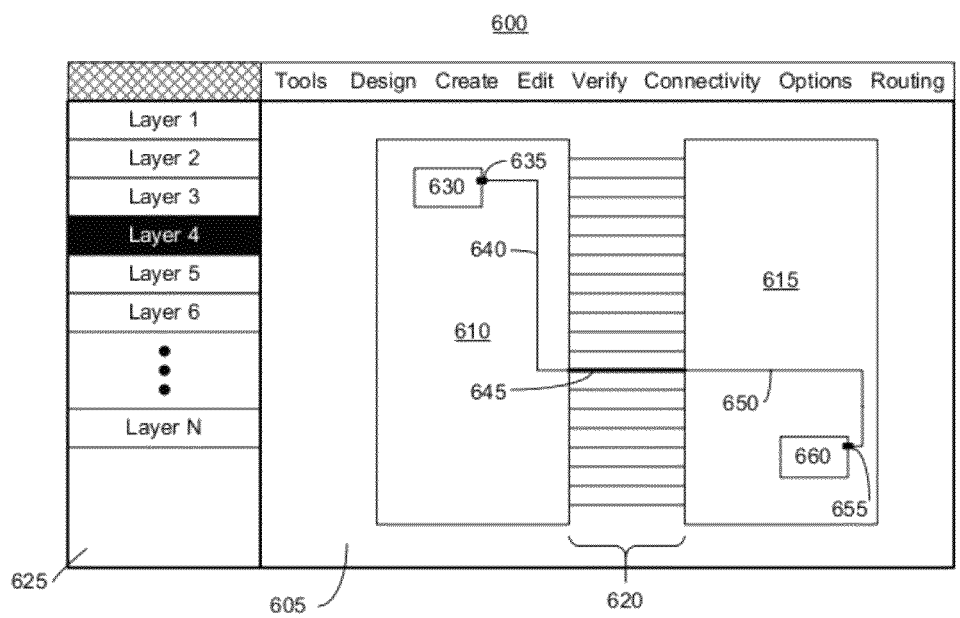
FIG. 6 is a fourth block diagram illustrating a view generated by a system for circuit design in accordance with one or more other embodiments disclosed within this specification.

FIG. 6 is a fourth block diagram illustrating a view generated by a system for circuit design in accordance with one or more other embodiments disclosed within this specification. FIG. 6 illustrates a unified graphical user interface (GUI) 600 that can be generated and displayed by a system as described within this specification for creating circuits for implementation within a multi-die IC. Unified GUI 600 facilitates presentation of selected aspects of a circuit design across multiple dies of a multi-die IC concurrently. The exemplary view presented within FIG. 6 illustrates a top view of the circuit design as implemented within the multi-die IC.

For purposes of discussion, each block representing a particular structure of the multi-die IC, e.g., a die, an interposer, etc., will be referred to using the name of the element rather than being referred to as a block or other visual object. Thus, rather than referring to a block 610 as a graphic representation within the unified GUI of a die, block 610 will be referred to as "die 610."

The system can be used to develop a circuit design for a multi-die IC as described within this specification with reference to FIGS. 3-5. Accordingly, the representation of a multi-die IC shown within window 605 can include a die 610 and a die 615. The interposer upon which die 610 and die 615 are mounted is a third die of the multi-die IC represented within window 605. As noted, in one or more embodiments, the interposer upon which die 605 and die 610 can be implemented can be an entirely passive die. As shown in FIG. 6, the interposer has been abstracted away leaving only inter-die wires 620 visualized, which couple die 610 with die 615.

In one example, die 610 and die 615 can be implemented using a same IC process technology that can be different from the IC process technology used to implement the interposer. In another example, die 610 and die 615 can represent dies that are implemented using different IC process technologies. The interposer can be implemented using an IC process technology that is the same as the IC process technology used to implement die 610 and/or die 615. Alternatively, the interposer can be implemented using an IC process technology that is different from the IC process technology used to implement both die 610 and die 615.

Window 605 can present any of a variety of different views of the circuit design being created. The views, for example, whether layout, circuit schematic, or the like, can be superimposed over die 610 and die 615 to illustrate the relative location of different connections and circuit elements with respect to die 610 and die 615. Inter-die wires 620 within the interposer, when assigned a signal of the circuit design, can be illustrated to show connections between die 610 and die 615 as specified by the circuit design. For example, an inter-die wire 620 not used by the circuit design can be visually distinguished from an inter-die wire 620 that is occupied by a signal of the circuit design. Alternatively, inter-die wires 620 not used by the circuit design can be hidden from view so that only those inter-die wires 620 that are occupied by a signal of the circuit design are shown.

Through window 605, the user can hierarchically navigate different design blocks, e.g., circuits, of the circuit design across die 610 and die 615 concurrently. Navigation of the circuit design using the system can be performed at the schematic level, at the layout level, at the functional level, or the like. In another example, the functionality, or substantially all of the functionality, of the circuitry within die 610 and/or die 615 can be abstracted away leaving only pin information.

Within window 625 of unified GUI 600, the different layers available within the multi-die IC are listed in the form of user selectable controls. The list of layers can be a comprehensive list of the layers available within each of the different IC process technologies used to fabricate each individual die of the multi-die IC. In one or more embodiments, layers belonging to one particular die or to one particular IC process technology, can be visually distinguished from one another within the list presented in window 625. In one or more other embodiments, a user can filter or choose to show within window 625 only layers of a particular die, particular dies, a particular IC process technology, or a selected plurality of IC process technologies. Selection of a control within window 625 causes the selected layers to be shown within window 605.

For example, the user can simply choose which layer(s) to view by selecting one of the enumerated layers. In this example, the user has selected "layer 4." Accordingly, in response to a user selection of layer 4, the system can present a layout view, a block view, a functional view, or an abstracted pin view as described that includes only elements of the circuit design implemented within layer 4. Layer filtering can be applied to die 610 and die 615 as well as to inter-die wires 620. For example, responsive to selecting the layer 4 control, the inter-die wires 620 showing can be those within layer 4 of the interposer. As noted, depending upon user preference, of those inter-die wires 620 shown within window 605, the inter-die wires can be those that are used by the circuit design, those that are unused by the circuit design and available, or both those that are used and unused.

Display of the circuit design utilizing two or more different PNS technology libraries as described, e.g., combined through a unified design library, allows circuit elements from different dies, and thus different IC process technologies, to be viewed concurrently within a same window. The system, for example, can present a view showing pins and connections allowing a circuit designer to view alignment of the pins and the signals between dies. The system can present a view of micro-bumps and determine whether the micro-bumps of adjacent dies are aligned correctly or whether complimentary alignment marks are properly placed.

Another example of the functionality provided by the system is the ability to probe nets that cross from one die to another, and thus span more than one IC process technology. Without the use of the unified design library, the physical design information for multiple dies would not be viewable concurrently within unified GUI 600.

In illustration, a design block 630 is shown having a pin 635 within die 610. Pin 635 is coupled to an inter-die wire 645 via internal routing 640. Internal routing 650 couples inter-die wire 645 to pin 655 of design block 660 within die 615. Leveraging the unified design library, a circuit designer can probe any points along the enumerated signal path despite the signal path traversing from die 610, corresponding to a first IC process technology, through the interposer, corresponding to a second IC process technology, and into die 615, corresponding to a third IC process technology. Information such as timing, power dissipation, and other physical properties of the signal path can be viewed and determined. The signal path described further illustrates one example of how an inter-die wire, e.g., inter-die wire 645, used by the circuit design can be visually distinguished from other ones of inter-die wires 620 not used by the circuit design.

Figure 7:
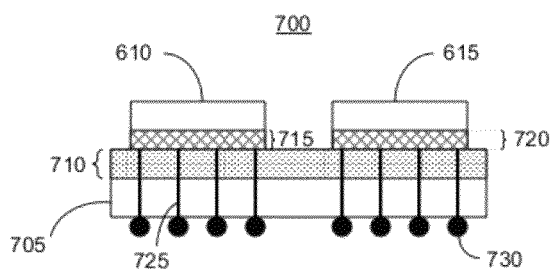
FIG. 7 is a fifth block diagram illustrating a view generated by a system for circuit design in accordance with one or more other embodiments disclosed within this specification.

FIG. 7 is a fifth block diagram illustrating a view 700 generated by a system for circuit design in accordance with one or more other embodiments disclosed within this specification. View 700 is a cross-sectional side view of the multi-die IC illustrating further aspects of the circuit design to be implemented within the multi-die IC that can be displayed by the system described with reference to FIGS. 1-2 and 6 of this specification. View 700 can be displayed illustrating that metal layers of the interposer are viewable as extensions of the metal layers of one or both of dies 610 and 615.

In this example, unlike the view illustrated in FIG. 6, the interposer is shown as element 705. The top region of interposer 705, labeled 710, represents a plurality of metal layers within interposer 705 used to implement the inter-die wires. The bottom region of die 610, labeled 715, represents a plurality of metal layers within die 610. The bottom region of die 615, labeled 720, represents a plurality of metal layers within die 615.

In one or more embodiments, the system can allow the user to zoom into the multi-die IC to view the metal layers of both interposer 705 and die 610 and/or die 615 in greater detail. In a zoomed in view, for example, a user can visually distinguish each of the metal layers within interposer 705, die 610, and/or die 615. As shown, TSVs 725 and package bumps 730 also can be illustrated in view 700. In the example presented in FIG. 7, micro-bumps used to couple die 610 and die 615 to interposer 705 can be abstracted away and, therefore, not shown. The micro-bumps can be modeled using any of a variety of different techniques to be described within this specification.

Figure 8:
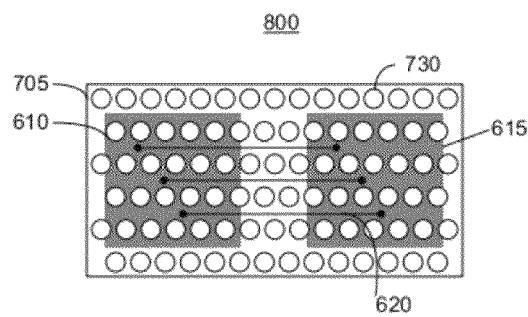
FIG. 8 is a sixth block diagram illustrating a view generated by a system for circuit design in accordance with one or more other embodiments disclosed within this specification.

FIG. 8 is a fifth block diagram illustrating a view 800 generated by a system for circuit design in accordance with one or more other embodiments disclosed within this specification. View 800 illustrates another view of the multi-die IC and further aspects of the circuit design to be implemented within the multi-die IC. More particularly, view 800 illustrates the bottom of interposer 705. View 800 illustrates the distribution and positioning of package bumps 730 in relation to the location of die 610 and die 615. Inter-die wires 620 also can be illustrated within interposer 705 showing the relative positioning of each inter-die wire 620 relative to die 610, die 615, and package bumps 730.

Figures 9, 10:
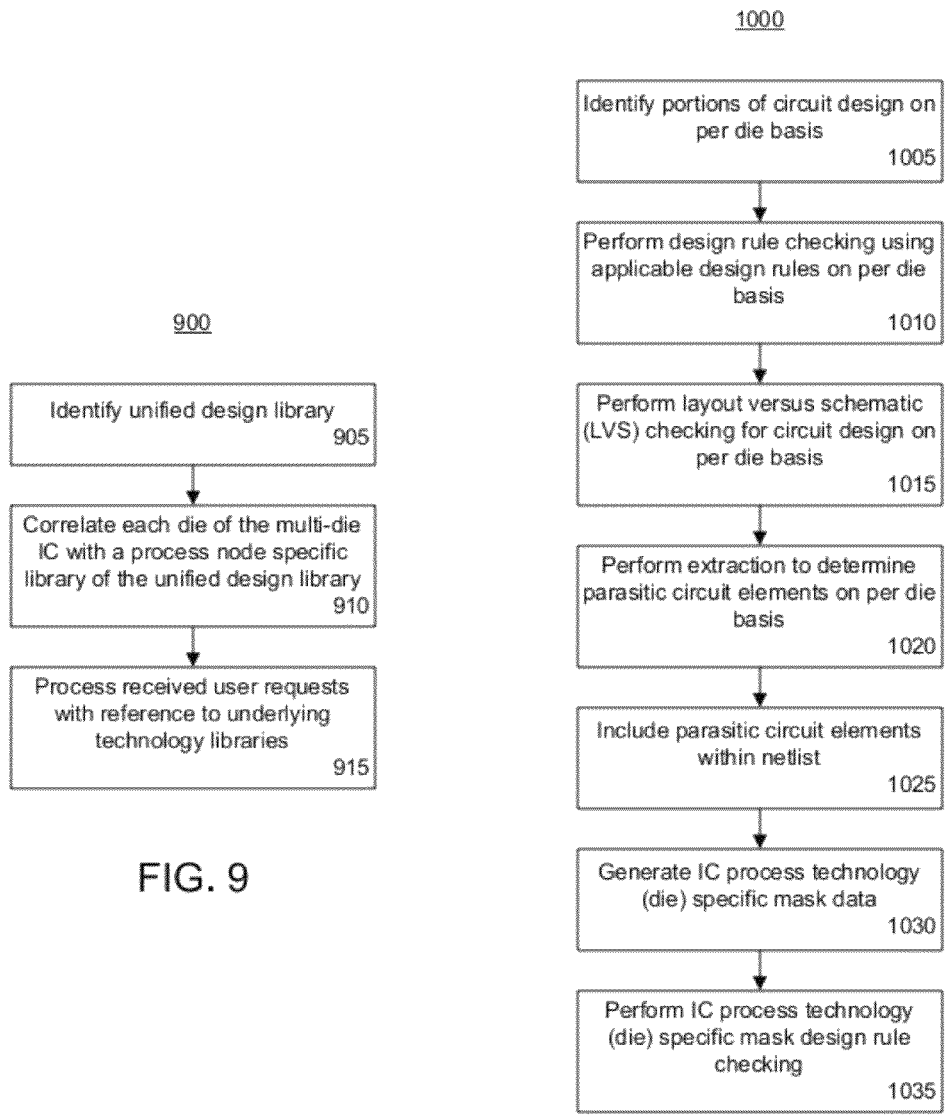
FIG. 9 is a first flow chart illustrating a method of circuit design in accordance with one or more other embodiments disclosed within this specification.
FIG. 10 is a second flow chart illustrating a method of circuit design in accordance with one or more other embodiments disclosed within this specification.

FIG. 9 is a first flow chart illustrating a method 900 of circuit design for a multi-die IC in accordance with one or more other embodiments disclosed within this specification. Method 900 can be performed by a system as described with reference to FIGS. 1-2 and 6-8 of this specification, for example.

Accordingly, beginning in step 905, a unified design library can be identified or selected for use by the system. In step 910, each PNS library of the selected unified design library can be correlated to a particular die of the multi-die IC for which the circuit design is being created. The system effectively assigns a particular PNS library of the unified design library to each die of the multi-die IC. In step 915, user requests can be processed with reference to the underlying PNS libraries of the unified design library.

For example, when a user input is received requesting the addition of a circuit element to a specified location within the circuit design, the system can identify a die and/or a layer of the die where the circuit element is to be added. The system can access the PNS library for the particular IC process technology of the die to properly specify the circuit component. A definition of the circuit element, as specified by the appropriate PNS library can be added to the circuit design.

FIG. 10 is a second flow chart illustrating a method 1000 of circuit design for a multi-die IC in accordance with one or more other embodiments disclosed within this specification. Method 1000 can be implemented by a system as described with reference to FIGS. 1-2 and 6-9 of this specification, for example. Method 1000 can begin in a state where a circuit design for the multi-die IC has been specified and further processing and/or analysis is desired.

In step 1005, the system can identify different portions of the circuit design on a per die basis. For example, the system can identify the portion of the circuit design, e.g., each circuit element, to be implemented within a first die of the multi-die IC, the portion of the circuit design implemented within a second die of the multi-die IC, and the like. Thus, each circuit element, e.g., whether a circuit block, a wire, or the like, can be assigned to, or correlated with, a particular die and, thus, a particular PNS library.

In step 1010, the system can perform design rule checking on a per die basis. For example, the system can perform design rule checking using applicable design rules for each identified portion of the circuit design. The system can perform design rule checking for the first portion of the circuit design using design rules specified within the particular PNS library corresponding, e.g., matching, the IC process technology used to implement the die that is to include the first portion of the circuit design. The system can continue performing design rule checking for each different die-specific portion of the circuit design as described.

In one or more embodiments, the system can be configured to perform one or more design rule checks relating to the implementation of the die-to-die interfaces. For example, the system can perform design rule checks for electrostatic discharge (ESD) rules that are specific to die-to-die physical boundaries, design rules checks for sacrificial metal within the circuit design, design rule checks for spacing and or distribution of micro-bumps, package bumps, and/or TSVs. In another example, the system can be configured to check for the presence, distribution, and/or density of dummy micro-bumps that can be located on the periphery of each die to facilitate micro-bump coplanarity.

In step 1015, the system can perform LVS checking. The system can analyze the layout of the circuit design on a per die basis using the relevant PNS library for each die and determine the various circuit elements represented by the layout information. Connectivity between the different identified circuit elements can be determined from examination of the connections made between the corresponding shapes of the layout within the metal layers. The LVS checking can be performed on a per die basis. Using the PNS library for each die in combination with the PNS library for the interposer, a schematic, or netlist, of the circuit design can be determined that specifies connectivity.

The netlist generated during LVS checking can be compared with a schematic of the circuit design to ensure that the layout does accurately reflect and implement the intended circuit design. At the completion of step 1015, a netlist is generated and output. The netlist generated in step 1015 can be considered a unified design file for the circuit design that includes circuit elements across multiple dies and, thus, from different IC process technologies.

In step 1020, the system can perform extraction. The term "extraction," as used within this specification, can refer to the determination of parasitic circuit elements for the circuit design on a per die basis. The extraction process can associate particular parasitic electrical effects, e.g., resistive, inductive, and/or capacitive, with different elements. The parasitic effects can be represented within the netlist in the form of one or more additional circuit elements, e.g., resistors (R), inductors (L), and/or capacitors (C). Alternatively, or in combination, extraction can represent particular circuit structures as a combination of resistive, inductive, and/or capacitive circuit elements.

For example, the micro-bumps that couple dies to the interposer can be treated, or modeled, as a via between the die and the interposer for purposes of design rule checking, LVS, and/or simulation. A via, as opposed to TSVs, are generally well-defined within different PNS libraries. In another example, TSVs can be treated by the system during extraction as a via. Alternatively, TSVs can be treated as a device to which an RLC model can be assigned. When treated as a device or a collection of devices, e.g., the RLC model which is frequency dependent, the device model can be used purposes of circuit simulation. In another example, structures such as TSVs and/or micro-bumps can be represented using an s-parameter model or the like.

In step 1025, the system can include the parasitic circuit elements determined through extraction within the netlist determined in step 1015. In some cases, the parasitic circuit elements can be used to augment the netlist, while in other cases circuit elements within the netlist can be replaced by the parasitic circuit elements determined in step 1020. Upon completion step 1025, an updated netlist, inclusive of the parasitic circuit elements, can be output. The updated netlist can be use for purposes of circuit analysis, e.g., simulation of timing, power consumption, probing, or the like.

In step 1030, the system can generate mask data for one or more selected IC process technologies. For example, consider the case where a first die of a multi-die IC is implemented using a first IC process technology, a second die of the multi-die IC is implemented using a second IC process technology, and a third die of the multi-die IC is implemented using a third IC process technology. The system can generate separate mask data for each IC process technology and, thus, for each die. The system, for example, can output the mask data for a user selected die or dies, or for each die responsive to an appropriate user command or instruction. In illustration, a user can select a portion or portions of a multi-die circuit design. The system can identify the particular dies that include the user selected portions and generate mask data (or multiple portions of mask data as the case may be) for the user selected portion(s) of the circuit design. Alternatively, the user can select a die or dies.

A layer mapping file can be used to generate mask data, e.g., a mask database file, from the layout database maintained within the system. When a user executes a command to create mask data, an appropriate layer mapping file, e.g., one that is for the particular IC process technology used to implement the die specified in the command, is used. Thus, dies one, two, and three each can have different layer mapping files. By creating multiple mask databases in which each mask database is IC process node specific, each different mask database can be sent to the particular foundry that will be used to manufacture the corresponding die(s). Typically, a given foundry will manufacture ICs, or in this case dies, of a specific IC process technology.

In step 1035, subsequent to generation of die-specific mask data, a mask design rule check can be performed. The mask design rule check is performed to ensure that no design rule violation has occurred in translating the unified mapping of layers for the multi-die IC back to IC process technology specific (PNS) layers. Further, in generating the die-specific mask data, one or more distinct layers as represented within the system for purposes of multi-die circuit design can be physically combined into a single mask layer. In that case, during mask data generation, the different layers as represented within the circuit design can be combined through Boolean operations. The mask design rule checking, which is IC technology specific, helps to ensure that no errors were introduced into the mask data when combining layers as described.

Within this specification, the same reference characters are used to refer to terminals, signal lines, wires, and their corresponding signals. In this regard, the terms "signal," "wire," "connection," "terminal," and "pin" may be used interchangeably, from time-to-time, within the this specification. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

The flowcharts in the figures illustrate the architecture, functionality, and operation of possible implementations of systems, methods and computer program products according to one or more embodiments disclosed within this specification. In this regard, each block in the flowcharts may represent a module, segment, or portion of code, which comprises one or more portions of executable program code that implements the specified logical function(s).

It should be noted that, in some alternative implementations, the functions noted in the blocks may occur out of the order noted in the figures. For example, two blocks shown in succession in FIG. 10 may, in fact, be executed substantially concurrently, or the blocks may sometimes be executed in the reverse order, depending upon the functionality involved. It also should be noted that each block of the flowchart illustrations, and combinations of blocks in the flowchart illustrations, can be implemented by special purpose hardware-based systems that perform the specified functions or acts, or combinations of special purpose hardware and executable instructions.

One or more embodiments can be realized in hardware or a combination of hardware and software. One or more embodiments can be realized in a centralized fashion in one system or in a distributed fashion where different elements are spread across several interconnected systems. Any kind of data processing system or other apparatus adapted for carrying out at least a portion of the methods described herein is suited.

One or more embodiments further can be embedded in a device such as a computer program product, which comprises all the features enabling the implementation of the methods described herein. The device can include a data storage medium, e.g., a non-transitory computer-usable or computer-readable medium, storing program code that, when loaded and executed in a system comprising memory and a processor, causes the system to perform at least a portion of the functions described within this specification. Examples of data storage media can include, but are not limited to, optical media, magnetic media, magneto-optical media, computer memory such as random access memory or hard disk(s), or the like.

The terms "computer program," "software," "application," "computer-usable program code," "program code," "executable code," variants and/or combinations thereof, in the present context, mean any expression, in any language, code or notation, of a set of instructions intended to cause a system having an information processing capability to perform a particular function either directly or after either or both of the following: a) conversion to another language, code, or notation; b) reproduction in a different material form. For example, program code can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

One or more embodiments disclosed within this specification can be embodied in other forms without departing from the spirit or essential attributes thereof. Accordingly, reference should be made to the following claims, rather than to the foregoing specification, as indicating the scope of the one or more embodiments.

What is claimed is:

1. A method of designing circuits for implementation within an integrated circuit (IC) comprising multiple dies, the method comprising:
   identifying a unified design library comprising a first process node specific (PNS) library for a first IC process technology and a second PNS library for a second IC process technology;
   correlating the first PNS library with a first die of the IC;
   correlating the second PNS library with a second die of the IC; and
   defining, via a processor, a circuit element of a circuit design implemented within the IC according to the PNS library correlated with the die in which the circuit element is located.

2. The method of claim 1, further comprising:
   concurrently displaying, via a display device, a first portion of the circuit design for implementation within the first die and a second portion of the circuit design for implementation within the second die while indicating the die within which each portion of the circuit design is to be implemented.

3. The method of claim 2, wherein the displaying comprises:

presenting a circuit schematic view of the first portion of the circuit design and a circuit schematic view of the second portion of the circuit design concurrently.

4. The method of claim 2, wherein the displaying comprises:
presenting a layout view of the first portion of the circuit design and a layout view of the second portion of the circuit design concurrently.

5. The method of claim 1, further comprising:
defining each circuit element of the circuit design implemented within the first die of the IC according to the first PNS library; and
defining each circuit element of the circuit design implemented within the second die of the IC according to the second PNS library.

6. The method of claim 1, further comprising:
performing design rule checking on a first portion of the circuit design implemented within the first die using the first PNS library; and
performing design rule checking on a second portion of the circuit design implemented within the second die using the second PNS library.

7. The method of claim 1, wherein the circuit design specifies a layout of the circuit design for the first die and a layout of the circuit design for the second die, the method further comprising:
determining first components from the layout of the circuit design for the first die according to the first PNS library;
determining second components from the layout of the circuit design for the second die according to the second PNS library; and
generating a netlist for the circuit design comprising the first components and the second components.

8. The method of claim 7, further comprising:
determining first parasitic circuit elements for a first portion of the circuit design within the first die according to the first PNS library;
determining second parasitic circuit elements for a second portion of the circuit design within the second die according to the second PNS library; and
including the first parasitic circuit elements and the second parasitic circuit elements within the netlist.

9. The method of claim 1, further comprising:
extracting a circuit property for a selected signal path defined by a start point within the first die of the IC and an end point within the second die of the IC.

10. A system for designing circuits for implementation within an integrated circuit (IC) comprising multiple dies, the system comprising:
a memory storing program code; and
a processor coupled to the memory, wherein the processor, upon executing the program code, is configured to perform a plurality of steps comprising:
identifying a unified design library comprising a first process node specific (PNS) library for a first IC process technology and a second PNS library for a second IC process technology;
correlating the first PNS library with a first die of the IC;
correlating the second PNS library with a second die of the IC; and
defining a circuit element of a circuit design implemented within the IC according to the PNS library correlated with the die in which the circuit element is located.

11. The system of claim 10, further comprising:
a display device coupled to the processor,
wherein the display device is configured to concurrently display a first portion of the circuit design for implementation within the first die and a second portion of the circuit design for implementation within the second die while indicating the die within which each portion of the circuit design is to be implemented.

12. The system of claim 10, wherein the processor is further configured to perform steps comprising:
defining each circuit element of the circuit design implemented within the first die of the IC according to the first PNS library; and
defining each circuit element of the circuit design implemented within the second die of the IC according to the second PNS library.

13. The system of claim 10, wherein the processor is further configured to perform steps comprising:
performing design rule checking on a first portion of the circuit design implemented within the first die using the first PNS library; and
performing design rule checking on a second portion of the circuit design implemented within the second die using the second PNS library.

14. The system of claim 10, wherein the circuit design specifies a layout of the circuit design for the first die and a layout of the circuit design for the second die, wherein the processor is further configured to perform steps comprising:
determining first components from the layout of the circuit design for the first die according to the first PNS library;
determining second components from the layout of the circuit design for the second die according to the second PNS library; and
generating a netlist for the circuit design comprising the first components and the second components.

15. The system of claim 14, wherein the processor is further configured to perform steps comprising:
determining first parasitic circuit elements for a first portion of the circuit design within the first die according to the first PNS library;
determining second parasitic circuit elements for a second portion of the circuit design within the second die according to the second PNS library; and
including the first parasitic circuit elements and the second parasitic circuit elements within the netlist.

16. The system of claim 10, wherein the processor is further configured to perform a step comprising:
extracting a circuit property for a selected signal path defined by a start point within the first die of the IC and an end point within the second die of the IC according to the unified design library.

17. A device, comprising:
a non-transitory data storage medium usable by a processor, wherein the data storage medium stores program code that, when executed by the processor, causes the processor to execute operations comprising:
identifying a unified design library comprising a first process node specific (PNS) library for a first integrated circuit (IC) process technology and a second PNS library for a second IC process technology;
correlating the first PNS library with a first die of the IC;
correlating the second PNS library with a second die of the IC; and
defining a circuit element of a circuit design implemented within the IC according to the PNS library correlated with the die in which the circuit element is located.

18. The device of claim 17, wherein the data storage medium further stores program code that, when executed, causes the processor to execute an operation comprising:

concurrently displaying a first portion of the circuit design for implementation within the first die and a second portion of the circuit design for implementation within the second die while indicating the die within which each portion of the circuit design is to be implemented.

19. The device of claim 17, wherein the data storage medium further stores program code that, when executed, causes the processor to execute operations comprising:

defining each circuit element of the circuit design implemented within the first die of the IC according to the first PNS library; and defining each circuit element of the circuit design implemented within the second die of the IC according to the second PNS library.

20. The device of claim 17, wherein the data storage medium further stores program code that, when executed, causes the processor to execute operations comprising:

determining first components from a layout of the circuit design for the first die according to the first PNS library;

determining second components from the layout of the circuit design for the second die according to the second PNS library; and generating a netlist for the circuit design comprising the first components and the second components.

\* \* \* \* \*